Aug. 9, 1949.　　　　L. J. DAHLINE　　　　2,478,373
FIRE DETECTING APPARATUS
Filed Dec. 30, 1946
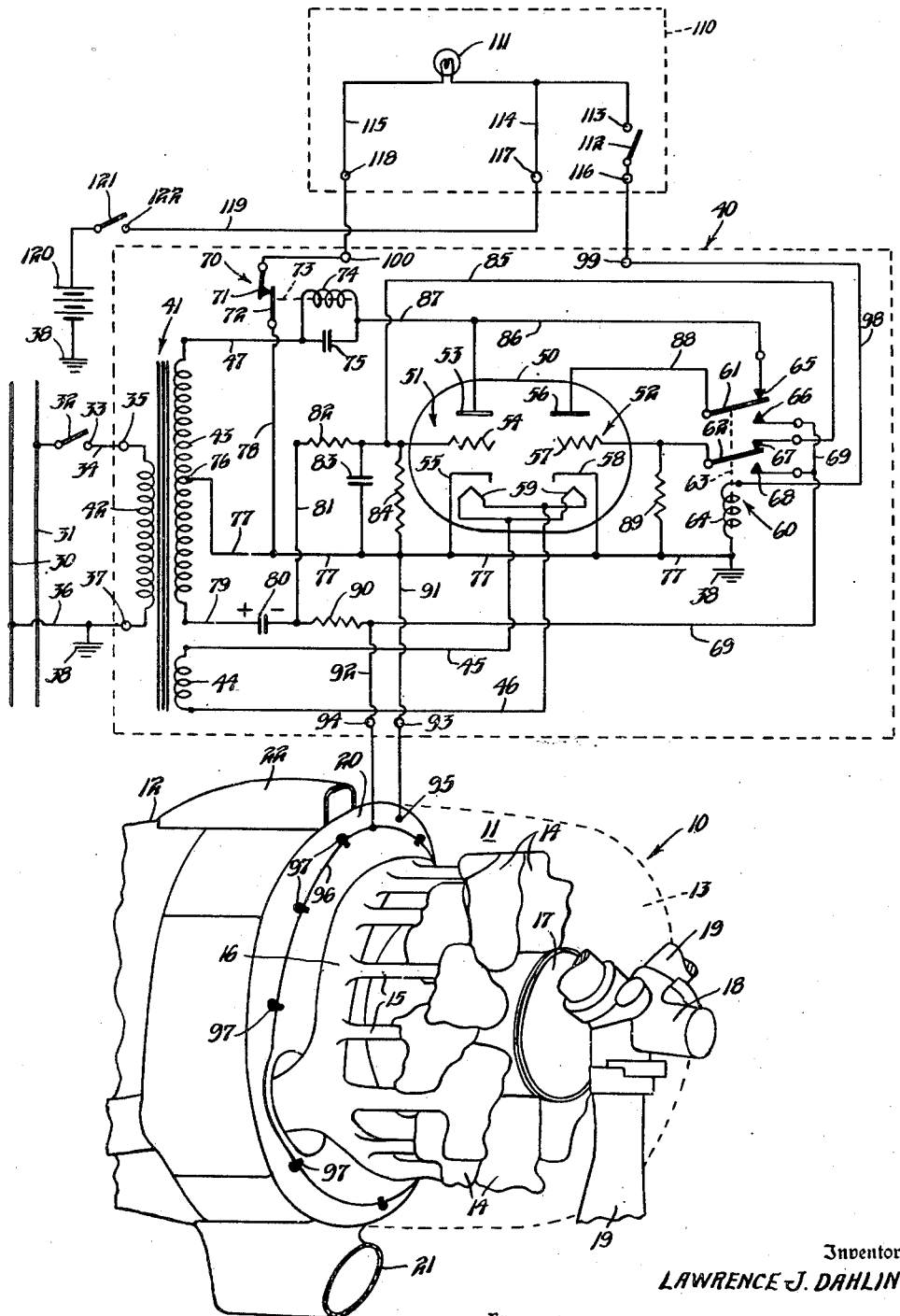
Inventor
LAWRENCE J. DAHLINE
George H. Fisher
Attorney Patented Aug. 9, 1949

2,478,373

UNITED STATES PATENT OFFICE 2,478,373

FIRE DETECTING APPARATUS

Lawrence J. Dahline, Minneapolis, Minn., assignor to Minneapolis-Honeywell Regulator Company, Minneapolis, Minn., a corporation of Delaware Application December 30, 1946, Serial No. 719,291

7 Claims. (Cl. 177—311)

The present invention is concerned with a type of flame detection system employing a rectifying flame sensitive impedance with electronic devices that will respond to any rectifying action that takes place when a flame is present at the flame detecting apparatus and more particularly such apparatus of the type depending for its operation upon current flow between two spaced electrodes when bridged by a flame.

It has been proposed in early type of flame detection systems to utilize the rectifying properties of a flame in one way or another to control the bias on some type of electron discharge device. Connected in circuit with the discharge device is some indicating device which upon the presence of flame will indicate that fact by an alarm. These early detection systems have had many characteristics which have inadvertently complicated the system. Test equipment provided has generally involved extra components which have meant added weight and cost. These systems also react sporadically to various flame conditions and to shorting impedances in the flame detector elements which give an indication which cannot be relied upon.

In providing an ideal flame detection system, it is necessary to have a system which can be quickly and accurately checked, preferably by using only components associated with the normal operating system. The system must employ some detecting means which is not sensitive to light so the detection apparatus may be placed in any position. It is also necessary to have a system that will distinguish between a continued flame and a momentary flash of flame as might occur upon a back fire of an internal combustion engine. The system must be able to distinguish between a flame condition and a condition of equipment failure, such as a short in the detecting elements or where the detecting elements are bridged by a flame like impedance. Another feature needed is some method of preventing high current arcs at flame electrodes especially when the electrodes are located in an area where much combustionable fuel is present as at the carburetor.

There is disclosed in a copending application of Vilynn O. Beam et al., Serial No. 473,514, filed January 25, 1943, now Patent No. 2,455,351, dated December 7, 1948, for "Fire detecting apparatus," an apparatus for detecting fire on or about an aircraft engine. This apparatus is one which utilizes the rectifying characteristics of a flame bridging a pair of flame electrodes to operate a flame detecting relay whenever there is a fire occurring in the area being protected. This apparatus provides a special testing circuit for determining the proper operation of the flame detection apparatus and this testing circuit includes a photocell which is connected in parallel with the flame electrodes of the apparatus when it is desired to test the same. This photocell is then subjected to the light of a test lamp and if the apparatus is operating properly the alarm will operate to indicate proper functioning of the entire apparatus. The present invention eliminates the need for the extra photocell and test light in testing the fire detection apparatus operation as well as providing a new type of fire detection circuit.

It is therefore an object of the present invention to provide a flame indicating system that will be able to distinguish between a condition of short circuit and one of flame regardless of how that short circuit is caused.

A further object of the present invention is to provide a method of accurately testing the operation of the system by employing a portion of the regular operating system as a means for testing.

A still further object of the present invention is to provide protection from a high current arc in the event of a short circuit at the flame electrodes.

A still further object of the present invention is to provide a system that will respond quickly to any continued flame condition but will not respond to a flash of flame as is caused by a back-fire.

A still further object of the present invention is to provide an indication of how the system is functioning upon the turning on of the system.

Other objects of the invention will be apparent from a consideration of the accompanying specification, claims, and drawing, in which:

The single figure is a schematic view of my fire detecting apparatus employed in connection with an airplane engine.

The numeral 10 is employed to designate a portion of a nacelle unit of an airplane engine. Included within this nacelle is an engine compartment 11 and the accessory compartment 12. The engine compartment 11 is generally enclosed by a cowl 13 shown by dotted lines on the diagram. Numeral 14 designates the cylinders of the engine. The exhaust system of the engine includes an exhaust pipe 15 and a common exhaust manifold 16. The numeral 17 designates the forward nose portion of the engine through which the drive shaft, not shown, extends and on which is fastened the propeller hub 18. Extending from the propeller hub 18 are propeller blades 19. Located between the engine compartment 11 and the accessory compartment 12 is a fire wall 20. An oil cooler shroud 21 and a carburetor intake 22 lead to an oil cooler and a carburetor respectively located within the accessory compartment 12.

Power is supplied to the apparatus through lines 30 and 31. In a line 34 connecting line 31 and terminal 35 of a housing 40 is located a switch 32 and an associated contact 33. Conductor 36 connects line 30 to terminal 37 of housing 40. Grounding of the system is done by ground 38 connected to conductor 36. Connected to terminals 35 and 37 of housing 40 is a primary winding 42 of transformer 41. A high voltage winding 43 and a low voltage winding 44 comprise the secondary windings of transformer 41. The low voltage winding 44 supplies filament voltage through conductors 45 and 46 to filaments 59 associated with triode 51 and triode 52 located within envelope 50. Associated with triode 51 is an anode 53, control grid 54, and a cathode 55, while associated with triode 52 is an anode 56, grid 57, and cathode 58.

The aforementioned grids and anodes are connected normally in a parallel relation by means of "out" contacts 65 and 67 of relay 60. Also associated with relay 60 are normally biased open switch arms 61 and 62 which are fastened on an armature 63. Upon energization of relay winding 64, the armature 63 causes the switch arms 61 and 62 to engage "in" contacts 66 and 68 respectively.

Located in the plate circuit of triodes 51 and 52 is an alarm relay 70 which has a contact 71 and switch arm 72 biased normally to a closed position. Energizing of relay winding 74 causes the armature 73 to move the switch arm 72 from the contact 71. A bypass condenser 75 is in parallel with the relay winding 74 to smooth out the pulsating current flowing through the plate circuit.

The operating voltage for the triodes 51 and 52 is obtained from that section of the transformer winding 43 located above center tap 76. The control grids 54 and 57 are connected in the other half of the high voltage winding 43 that is located below the center tap 46. In circuit with this connection is a chargeable condenser 80 and a filter comprising a resistor 82 and a condenser 83. Biasing resistors 84 and 89 are associated with control grids 54 and 57 respectively and act as load resistors for condenser 83.

A current limiting resistor 90 is in the flame detector circuit and is connected to a flame electrode 96 through terminal 94 of housing 40. The return circuit provided for the flame detection system is by way of connection 95 and terminal 93 of housing 40 to the ground conductor 77. Associated with the flame electrode 96 are high voltage insulators 97.

Within a housing 110 is located an indicating lamp 111 and a test switch 112 with its associated contact 113. An auxiliary power supply 120 is provided for the indicating lamp 111 in the event of a power failure. A switch 121 and contact 122 is used for switching the auxiliary power supply circuit.

While the various elements of the system described so far may have a wide range of values, in one particular embodiment of the invention it was found desirable to employ a transformer having a high voltage secondary winding with 300 volts available on both sides of the center tap. In the same embodiment a 7N7 type tube was employed. The condenser 80 was .001 microfarads while the condenser 83 was .02 microfarads. The bypass condenser 75 had a value of .2 microfarads. The grid biasing resistors 84 and 89 were each 30 megohms while the filter resistor 82 was 3 megohms. The current limiting resistor 90 had a value of 5 megohms. It is to be understood, as noted above, that these values are purely illustrative of those employed in one embodiment of the invention and that the invention is not in any way limited to the use of elements of these particular values.

Operation

The apparatus is shown in the completely de-energized position with the switch arms of the relays in the position as shown on the diagram and the indicating lamp not energized. Closing the switch blade 32 energizes transformer 41 and thusly by way of transformer 44, and conductors 45 and 46 the filaments 59 will begin to heat up. Closure of the switch 121 will allow completion of a circuit for the storage battery 120 through switch 121, contact 122, conductor 119, terminal 117, conductor 114, indicating lamp 111, conductor 115, terminal 118, terminal 100, contact 71, switch arm 72, conductor 78, conductor 77, and ground connection 38. This last circuit will remain operative until such time as the filaments 59 have heated the cathodes 55 and 58 to the current emissive point, in a manner to be described. Energizing the primary 42 of the transformer 41 will also energize the high voltage secondary winding 43. As soon as cathode 55 has been heated to the electron emissive point it is possible to establish a current path from the upper terminal of transformer winding 43, through conductor 47, relay winding 74, conductor 87, plate 53, cathode 55, conductor 77, center tap 76 back to the winding 43. A similar circuit can be established for the triode 52 when its cathode 58 becomes electron emissive. A conductive path may be established from the upper terminal of transformer winding 43, through conductor 47, relay winding 74, conductor 87, conductor 86, switch contact 65, switch arm 61, conductor 88, plate 56, cathode 58, grounded conductor 77, center tap 76 back to the winding 43. The control grid 54 is connected to a point in the power supply that is considerably more negative than the cathode, however, since the connection is by way of a voltage divider network including condenser 80, resistor 82 and condenser 83 to the lower portion of winding 43 it is possible for the control grid to be only slightly negative with respect to the cathode 55. Without the addition of any further voltage on the control grid 54 it is possible for the triode 51 to conduct during the positive half cycles of the alternating power source. By the same token, it is possible for triode 52 to conduct because there is a direct connection between control grid 54 and control grid 57 by way of conductor 85, contact 67, and switch arm 62.

As soon as tubes 51 and 52 are in a conducting state a plate current from the tubes will flow through relay winding 74 and will cause the armature 73 to move the switch arm 72 from the contact 71 and open the circuit to the lamp 111. With the extinguishing of the lamp 111 the observer is assured of the proper operation of the alternating power source of the detection apparatus as well as the system in general. During the negative half cycles of the alternating power source the control grids 54 and 57 will tend to go positive with respect to their respective cathodes 55 and 58, such that there will be a grid current flow. This grid current flow will tend to charge the condenser 80 such that the right hand side will be negative and the left hand side positive. Since the positive voltage applied to the grids, 54 and 57, is very small because of the effective voltage divider network comprising condenser 80, resistor 82 and condenser 83 in the circuit between the lower half of the winding 43 and the grids and cathodes of the tubes 51 and 52 it can be seen that the grid current flowing will be very small and the resultant charge in condenser 80 will be negligible. The little charge that is accumulated on condenser 80 will have little effect on the conductivity of the tubes and any resultant decrease in plate current flow will not deenergize the relay winding 74.

Should a flame bridge the gap between the electrode 96 and the fire wall 20 a resultant conductive path would allow the completion of an alternating current path starting from the lower terminal of the high voltage secondary winding 43 through conductor 79, condenser 80, resistor 90, conductor 92, terminal 94, electrode 96, the flame conducting path, fire wall 20, connector 95, terminal 93, conductor 91, conductor 77 and center tap 76 of the winding 43. Because of the alternating current supplied to the circuit and the fact that the flame has rectifying properties it is possible to build up a charge on condenser 80 such that the condenser 80 will assume a charge that is negative on the right side and positive on the left side.

As the circuit impedances of the flame rectifier, including the impedance of the flame gap, are lower than the grid-cathode rectifier circuit impedances, with the same voltage applied, a larger current will flow in the flame rectifier and will therefore charge condenser 80 an appreciable amount.

With the right side of the condenser 80 connected by way of conductor 81, and resistor 82 to the grid 54, and the left side of condenser 80 connected by conductor 79, lower half of secondary winding 43, center tap 76, and ground conductor 77 to the cathode 55, it may be seen that any voltage charge on condenser 80 will have a biasing effect on the tube 51. As tube 52 is normally connected in parallel with tube 51 the biasing effect will be felt on tube 52. The voltage charge built up on condenser 80 due to a flame is sufficient to bias the tubes 51 and 52 and decrease the plate current flow of these tubes. With the decreased plate current flow it is impossible to maintain relay 70 in an energized position which will result in the armature 73 allowing switch arm 72 to close with contact 71 and complete a circuit to lamp 111 to indicate a flame.

The resistor 82 and condenser 83 that form a filter network on the input to the grids of the triodes 51 and 52 act in a time delay sense to prevent the grids from being cut off immediately. This is readily apparent when one considers that the filter network is in parallel with condenser 80 and the lower section of the winding 43. Since the condenser 83 tries to assume the same potential as condenser 80 there will be a current flow through resistor 82 which tends to slow down the charging of the condenser 83. This time delay as controlled by the RC time constant of the filter network is chosen so as to make the system insensitive to a flash of flame or a back fire.

With the relatively high voltage applied to the flame gap circuit by way of the lower half of the high voltage winding 43 it is apparent that a short or a break down of the insulators 97 would allow a high current arc to be present were it not for the current limiting resistor 90. Were such an arc present it would obviously ignite any combustible fuels present in the area. The current limiting resistor 90 also functions to protect any personnel who might be working in the vicinity of the flame electrode 96 since a lethal amount of current would not flow through a resistor of proper size.

In the event of a short circuit between the electrode 96 and the fire wall 20, the indicating system would not indicate a flame condition because the circuit established by the short circuit would tend to connect the right side of limiting resistor 90 to the cathode connection of tubes 51 and 52 through conductor 92, terminal 94, electrode 96, the short circuit, fire wall 20, terminal 95, terminal 93, and conductor 91. The limiting resistor 90 is now in parallel relationship with the filter network comprising resistor 82 and condenser 83 and the biasing resistor 84 so that the alternating voltage on the control grids of tubes 51 and 52 will be even less negative than it was prior to the short. Obviously the conductivity of tubes 51 and 52 will not have been decreased and therefore the relay 70 remains in an energized position and will not allow the indicating light circuits to be closed. Should the test circuit be closed by means of switch 112, the indicating lamp will still not be energized and will therefore indicate a system malfunction in a manner to be explained hereinafter.

Were the flame electrode 96 and the fire wall 20 bridged by a "flame-like" impedance no rectification would take place and therefore no charge would be accumulated on condenser 80 which would mean that the conductivity of the triodes 51 and 52 would not be altered to allow deenergization of the relay 70. With a flame bridging the flame gap in addition to a "flame-like" impedance there will be sufficient rectification from the flame to charge condenser 80 an appreciable amount and ultimately deenergize relay 70.

Should a break occur in the electrode 96, the circuit would remain operative because there are two return paths to the terminal 94 since the electrode 96 is a complete circle.

Testing of the system is accomplished by changing triode 52 into a diode and reconnecting it in the circuit in a manner similar to the flame gap so that the rectification of the diode will act in the same manner as the rectification of the flame gap. To accomplish this it is necessary to close switch 112 so it engages contact 113. When this has been done a circuit has been established for the relay winding 64 of relay 60, and may be traced from the positive terminal of battery 120, through switch arm 121, contact 122, conductor 119, terminal 117, conductor 114, contact 113, switch arm 112, terminal 116, terminal 99, conductor 98, and winding 64 to ground. With the energization of relay winding 64, the armature 63 will disengage switch arms 61 and 62 from contacts 65 and 67 respectively and will cause switch arm 61 to engage contact 66 and switch arm 62 to engage contact 68. With the opening of contact 65 and contact 67 it is obvious that triode 52 is no longer connected in parallel with triode 51. With the new position of the switch arms 61 and 62 the anode 56 and grid 57 of tube 52 have been connected together by means of conductor 88, switch arm 61, contact 66, conductor 68, contact 68 and switch arm 62. With the energizing of relay 60, a new plate circuit is established for tube 52 from the lower terminal of the winding 43, through conductor 79, condenser 80, resistor 90, conductor 69, contact 66, switch arm 61, conductor 88, plate 56, cathode 58, conductor 77 to tap 76 of winding 43. With the tube 52 connected as just described it can be seen that the tube will act as a rectifier with grid 57 and anode 56 forming the anode section of the tube and the cathode 58 forming its usual function, the tube being connected in parallel with the flame gap. With the tube 52 connected as a diode in the last circuit described the tube tends to build up a charge on condenser 80 such that the right hand side is negative and the left hand side is positive in the same manner as when the flame bridges the gap between the flame electrode 96 and the fire wall 20. Again the negative charge on the right side of the condenser 80 will cause the grid 54 of tube 51 to become more negative and will cause the tube to stop conducting and allow deenergization of relay 70 in a manner previously described. As soon as the relay 70 has been deenergized, the switch blade 72 engages the contact 71 and will again close the indicating lamp circuit and indicate proper functioning of the system. Opening switch arm 112 causes the deenergization of the relay winding 64 of relay 60 and, since the switch arms are normally biased in the position shown, completion of the circuits through contacts 65 and 67 and thusly reconnection of tube 52 in its original position in parallel with tube 51.

By using this type of testing means, it is possible to eliminate extra testing equipment and still have a sure test method. Since tube 51 is disconnected from tube 52 during the test, the sensitivity of the system has been decreased and therefore gives added meaning to the test. Proper operation of tube 52 is also ascertained by its ability to act as a rectifier in the test circuit.

When a short circuit is present between the electrode 96 and the fire wall 20, closing of the test switch will not deenergize the relay 70 for it is not possible for the condenser 80 to charge. This is because the power supply voltage for diode 52 has been shorted and therefore there is no rectifying action to charge the condenser 80.

While I have disclosed my fire detection system in connection with an airplane engine and while it is particularly suitable for such an application, it is to be understood that it could be employed in any condition where fire detection or indication is deemed of importance. In general, while I have disclosed a specific embodiment of my invention, it is to be understood that this is for purposes of illustration and that my invention is to be limited solely by the scope of the appended claims.

I claim:

1. In a flame detection system; flame responsive means; means operable by said flame responsive means including two normally conducting electron discharge devices connected in parallel and which will become nonconductive on the presence of flame at said flame responsive means; current responsive means located in circuit with said discharge devices having a biased closed switching means; indicating means energized by the deenergization of said switching means; and means for altering one of said discharge devices so that it will act in place of and independent of said flame responsive means to cause the other of said discharge devices to become nonconductive and thereby cause energization of said indicating means wherewith an indication of proper functioning of said system.

2. In a flame detection system; flame responsive means having current rectifying properties; two electron discharge devices connected in parallel with operative circuits therefor; a power source connected to said discharge devices such that said devices are normally in a conducting state; means connecting said flame responsive means to said discharge devices as to render said devices nonconductive on the presence of flame; indicating means; means responsive to said nonconductivity to actuate said indicating means; and means operable to disconnect one of said parallel discharge devices from said operative circuit and reconnect said discharge device as a rectifying element in parallel with said flame responsive means where said disconnected discharge device acts as a testing means to ascertain proper operation of said system.

3. In a flame detection system; flame responsive means; indicating means; further means responsive to said flame responsive means upon a flame condition at said flame responsive means for operating said indicating means and including a plurality of switching means and two electron discharge devices with operative circuits therefor such that said devices normally act as amplifiers; and means including said switching means to cause one of said discharge devices to be reconnected as a rectifying means in the operative section of said remaining discharge device such that said last named discharge device will cause said further means to operate said indicating means in a manner simulating a flame condition.

4. In a flame detection system; an electrical device rendered operative on the presence of flame; flame responsive means having rectifying properties; a condenser; a power source connected through said condenser to said flame responsive means such that said condenser will assume a charge on the presence of flame; switching means; two electron discharge devices for energizing said electrical device normally connected in a parallel relationship by said switching means and having control elements operable within two ranges depending on said charge of said condenser; and actuating means for changing said switching means and reconnecting one of said discharge devices in parallel with said flame responsive means in a way to allow the charging of said condenser to a polarity to simulate a flame condition at said flame responsive means when said system is operating correctly.

5. A fire detection apparatus comprising in combination, fire responsive means, indicating means, amplifier means having an input and output circuit, means connecting said fire responsive means to said input circuit and said indicating means to said output circuit, said fire responsive means being effective to cause said amplifier to operate said indicating means on the presence of a fire, and means including a portion of said amplifier for creating an effect on said input circuit corresponding to the effect of said fire responsive means upon said amplifier to check the operation of said apparatus.

6. A fire detecting apparatus, comprising in combination, an electrode, a second element spaced relative to said electrode such as to cause establishment of a conductive path on the presence of a fire, indicating means for indicating the presence of fire, amplifier means connected to and responsive to the establishment of said conductive path, said amplifier having input and output terminals, means connecting said indicating means to said output terminals, and means including a portion of said amplifier means for creating an effect corresponding to said conducting path on the input of said amplifier for checking operation of said apparatus.

7. A fire detecting apparatus, comprising in combination, fire responsive means operable on the presence of a fire to give an electrical indication of the presence of fire, amplifier means for amplifying the electrical indication of said fire responsive means, said amplifier having input and output terminals and comprising a pair of discharge devices with corresponding elements of said device normally connected together, means connecting said fire responsive means to said input terminals, indicating means for indicating the presence of a fire, means connecting said indicating means to said output terminals to be rendered operative on the presence of a fire, and means reconnecting one of said discharge devices to the input of said amplifier to simulate said electrical indication to check operation of said apparatus.

LAWRENCE J. DAHLINE.

REFERENCES CITED

The following references are of record in the file of this patent:

UNITED STATES PATENTS

| Number | Name | Date |
|---|---|---|
| 2,243,071 | Crago | May 27, 1941 |
| 2,297,821 | Whempner | Oct. 6, 1942 |
| 2,302,271 | Smith | Nov. 17, 1942 |
| 2,313,943 | Jones | Mar. 16, 1943 |
| 2,343,001 | Cohen | Feb. 29, 1944 |
| 2,360,532 | Yates | Oct. 17, 1944 |
| 2,385,976 | Evans | Oct. 2, 1945 |
| 2,402,117 | Shaffer | June 11, 1946 |